United States Patent
Yang et al.

(10) Patent No.: US 8,248,815 B2
(45) Date of Patent: *Aug. 21, 2012

(54) KEY ASSEMBLY AND PORTABLE ELECTRONIC DEVICE USING THE SAME

(75) Inventors: Mu-Wen Yang, Taipei Hsien (TW); Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 400 days.

This patent is subject to a terminal disclaimer.

(21) Appl. No.: 12/538,274

(22) Filed: Aug. 10, 2009

(65) Prior Publication Data

US 2010/0128460 A1 May 27, 2010

(30) Foreign Application Priority Data

Nov. 25, 2008 (CN) .......................... 2008 1 0305730

(51) Int. Cl.
*G11C 11/00* (2006.01)
(52) U.S. Cl. ........ 361/786; 361/837; 361/785; 361/759; 361/679.09; 174/276; 200/343; 200/339

(58) Field of Classification Search .................. 361/786, 361/679.09, 837, 828, 785, 759; 200/343, 200/339, 295, 280, 282, 252, 245; 174/261
See application file for complete search history.

(56) References Cited

U.S. PATENT DOCUMENTS

2006/0073738 A1* 4/2006 Nagaoka et al. ............... 439/721
2010/0126837 A1* 5/2010 Yang et al. ..................... 200/329

* cited by examiner

*Primary Examiner* — Yuriy Semenenko
*Assistant Examiner* — Andargie M Aychillhum
(74) *Attorney, Agent, or Firm* — Altis Law Group, Inc.

(57) ABSTRACT

A key assembly comprises a base plate, two elastic elements and a key body. The elastic elements are both mounted to the base plate, and the elastic elements are spaced from and opposite to each other. The key body is slidably mounted to the base plate between the two elastic elements. The key body includes a first key section and a second key section connected with the first key section. The first key section has an arcuate first contacting portion formed thereon. The second key section has an arcuate second contacting portion formed thereon. The first key section resists one of the two elastic elements, the second key section resisting another elastic element. When the first key section slides toward and compresses the elastic element that resists the first key section, the second key section slide away from the elastic element that resists the second key section.

7 Claims, 7 Drawing Sheets

US 8,248,815 B2

KEY ASSEMBLY AND PORTABLE ELECTRONIC DEVICE USING THE SAME

This application is related to co-pending U.S. patent application Ser. Nos. 12/538,277, 12/538,278, 12/538,279, entitled "KEY ASSEMBLY AND PORTABLE ELECTRONIC DEVICE USING THE SAME", by Mu-Wen Yang et al. Such applications have the same assignee and inventorship as the present application and have been concurrently filed herewith. The above-identified applications are incorporated herein by reference.

BACKGROUND

1. Technical Field

The exemplary disclosure generally relates to key assemblies, and particularly to key assemblies used in portable electronic devices.

2. Description of Related Art

With the development of smaller and lighter electronic devices for portable use, key assemblies become more compact with individual keys more tightly spaced. Unfortunately, users of these portable electronics devices sometimes experience difficulty in activating keys that are close together; multiple and/or erroneous keys may be activated at the same time. This drawback exists not only in cellular telephones, but other portable electronic devices with key assemblies.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the exemplary key assembly and portable electronic device using key assembly. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
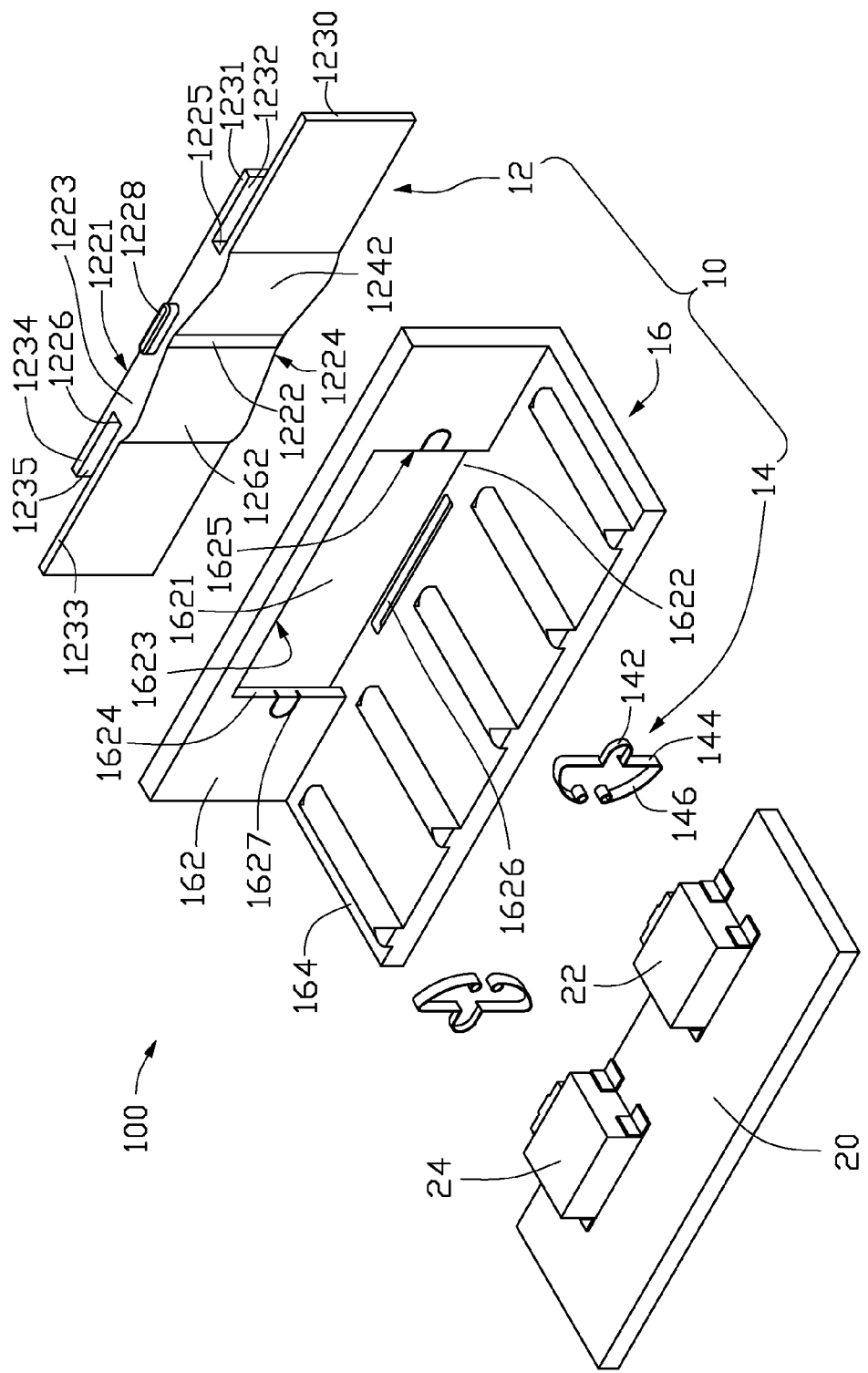
FIG. 1 is an exploded view of an exemplary embodiment of a key assembly used in a portable electronic device, the portable electronic device including the key assembly, a housing, and a circuit board.
Figure 2:
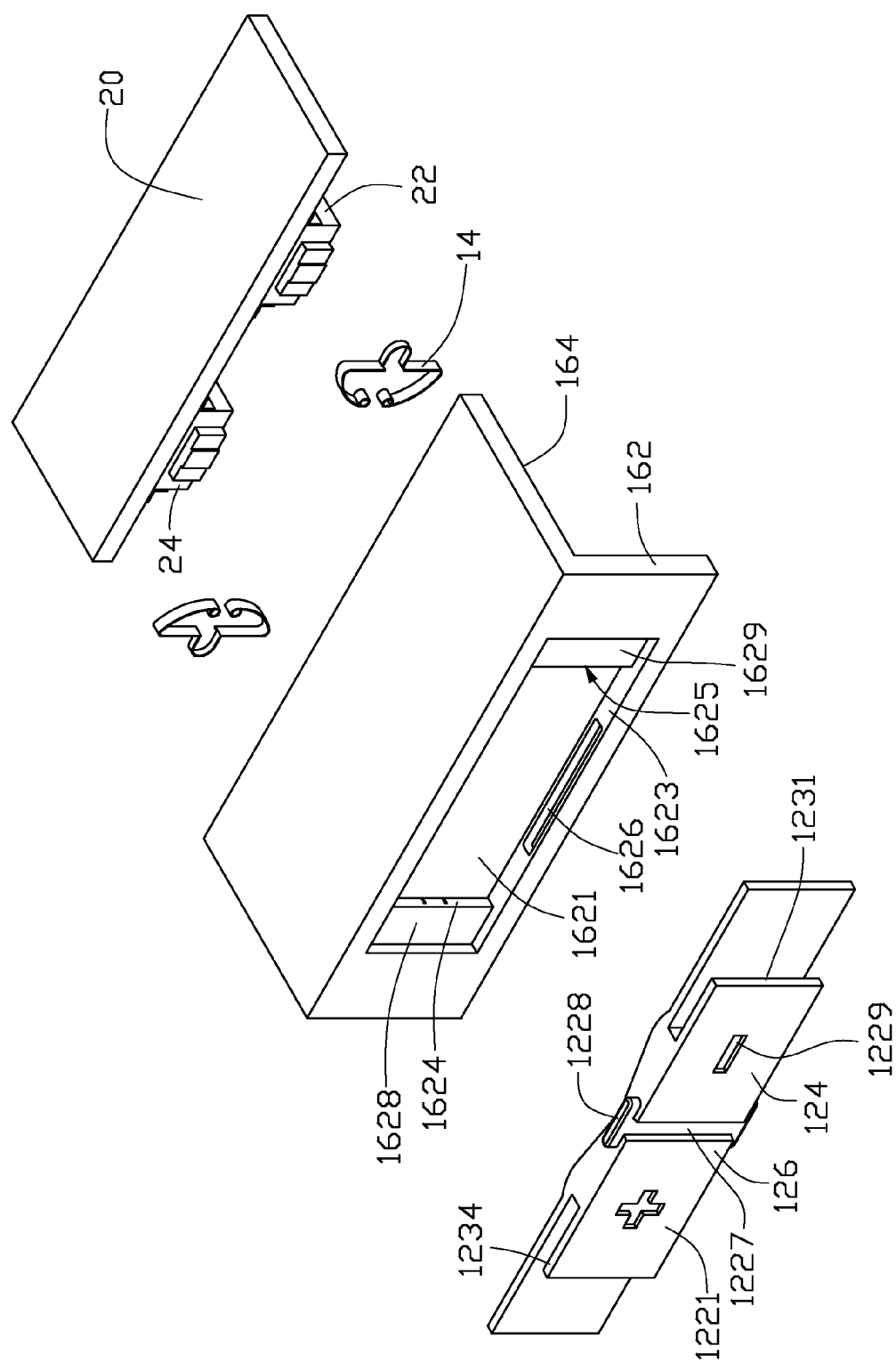
FIG. 2 is similar to FIG. 1, but showing the portable electronic device in another aspect.

Referring to FIGS. 1 and 2, an exemplary embodiment of a key assembly 10 can be used on a portable electronic device 100, such as a cellular phone or any electronic device where a key is desirable. The portable electronic device 100 includes a key assembly 10 and a circuit board 20. The circuit board 20 has a first switch 22 and a second switch 24 spaced from the first switch 22. The key assembly 10 is configured to press the first switch 22 and the second switch 24, so as to control the circuit board 20.

The key assembly 10 includes a key body 12, two elastic elements 14 and a base plate 16. The key body 12 and the elastic elements 14 are both mounted to the base plate 16. The base plate 16 may be a portion of the housing of the portable electronic device 100 or may be a separate element mounted to the housing of the portable electronic device 100. In this exemplary embodiment, the base plate 16 is a portion of the housing of the portable electronic device 100.

The key body 12 includes an operating surface 1221 facing the outside of the portable electronic device, a contacting surface 1222 opposite to the operating surface 1221, a first side surface 1223, a second side surface 1224 opposite to the first side surface 1223, a first end 1225 and a second end 1226 opposite to the first end 1225. The operating surface 1221 has a trough 1227 transversely defined near a center thereof, thus the key body 12 is divided into a first key section 124 located at one side of the trough 1227 and a second key section 126 located at another side of the trough 1227. The first key section 124 corresponds to the first switch 22, the second key section 126 corresponds to the second switch 24. The key body 12 further has two guiding blocks 1228 protruding from the first side surface 1223 and the second side surface 1224, respectively. The guiding blocks 1228 are coaxial and are slidably assembled to the base plate 16.

The operating surface 1221 has indicia 1229 respectively defined in the first key section 124 and the second key section 126, to indicate the function of the first key section 124 and the second key section 126. The indicia 1229 of the first key section 124 may be a "−", to indicate the function of the second key section 126 is decreasing volume. The indicia 1229 of the second key section 126 may be a "+", to indicate the function of the first key section 124 is increasing volume.

The key body 12 has an first arcuate contacting portion 1242 protruding from the contacting surface 1222 at the first key section 124. The first contacting portion 1242 corresponds to and is configured to trigger the first switch 22. The key body 12 has an second arcuate contacting portion 1262 protruding from the contacting surface 1222 at the second key section 126. The second contacting portion 1262 corresponds to and is configured to trigger the second switch 24. The first contacting portion 1242 and the second contacting portion 1262 may be constructed from an injection-molded thermoplastic elastomer and configured to produce a point contact sensation in a user's fingertip to provide tactile feedback when a user presses the key body 12.

The key body 12 has a first securing section 1230 and a second securing section 1231 protruding outwardly from the first end 1225 thereof. The first securing section 1230 is spaced from and parallel to the second securing section 1231, so a first securing space 1232 is formed between the first securing section 1230 and the second securing section 1231. The key body 12 has a third securing section 1233 and a fourth securing section 1234 protruding outwardly from the first end 1225 thereof. The third securing section 1233 is spaced from and parallel to the fourth securing section 1234, so a second securing space 1235 is formed between the third securing section 1233 and the fourth securing section 1234. In this embodiment, the first securing section 1230 and the third securing section 1233 are made of flexible material (e.g., thermoplastic elastomer), to facilitate assembling the key body 12 to the base plate 16. The rationale of assembling the key body 12 to the base plate 16 will describe hereinafter.

Each elastic element 14 is a elastic plate including a U-shaped securing portion 142, two connecting portions 144 and two arcuate compressing portions 146. The connecting portions 144 oppositely protrude from two opposite ends of the securing portion 142, respectively. Each compressing portions 146 protrude from a distal end of one connecting portion 144.

The base plate 16 includes a peripheral wall 162 and a bottom wall 164 substantially perpendicularly connected to the peripheral wall 162. The peripheral wall 162 has a hole 1621 defined therein corresponding to the key body 12. The hole 1621 is sized and configured to engage with the key body 12. The peripheral wall 162 has a first inner wall 1622, a second inner wall 1623 opposite to the first inner wall 1622, a third inner wall 1624 and a fourth inner wall 1625, all of which are defined in the hole 1621. The first inner wall 1622 is level with the bottom wall 164, and the second inner wall 1623 is parallel to the bottom wall 164. The third inner wall 1624 and the fourth inner wall 1625 respectively connect the first inner wall 1622 with second inner wall 1623.

The peripheral wall 162 further has two guiding grooves 1626 defined in the first inner wall 1622 and the second inner wall 1623, respectively. The guiding grooves 1626 correspond to and are configured to accommodate the guiding blocks 1228 therein. The peripheral wall 162 has two securing grooves 1627 respectively defined in the third inner wall 1624 and the fourth inner wall 1625, and the securing grooves 1627 is defined through an inner surface of the peripheral wall 162. The securing grooves 1627 are configured to accommodate the securing portions 142 of the elastic elements 14. Additionally, the peripheral wall 162 has a first receiving groove 1628 defined in the third inner wall 1624 and a second receiving groove 1629 defined in the fourth inner wall 1625. The first receiving groove 1628 and the second receiving groove 1629 are both defined through an outer surface of the peripheral wall 162. The first receiving groove 1628 is larger than and configured for accommodating the fourth securing section 1234, so the fourth securing section 1234 can slide in the first receiving groove 1628. The second receiving groove 1629 is larger than and configured for accommodating the second securing section 1231, so the second securing section 1231 can slide in the second receiving groove 1629.

Figure 3:
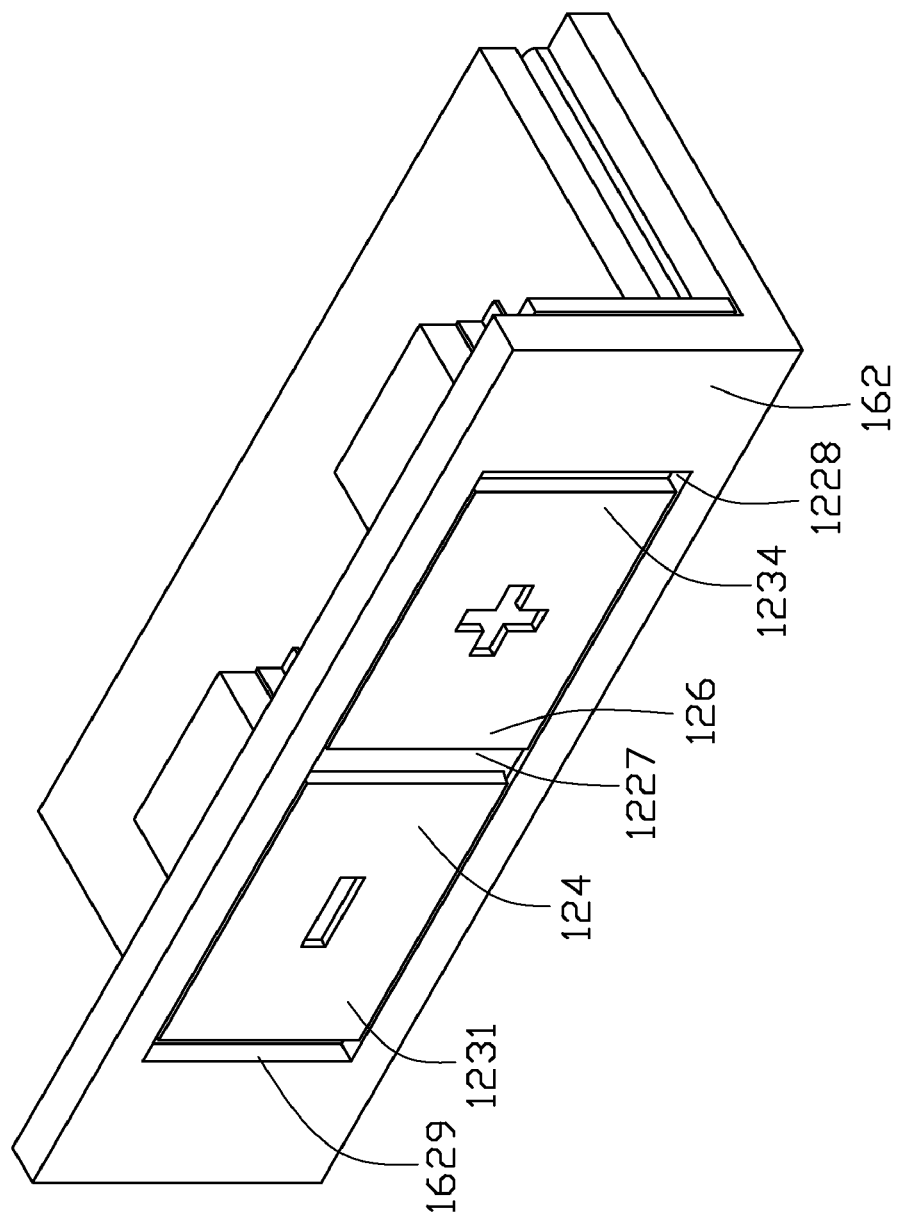
FIG. 3 is an assembled, isometric view of the portable electronic device shown in FIG. 1.
Figure 5:
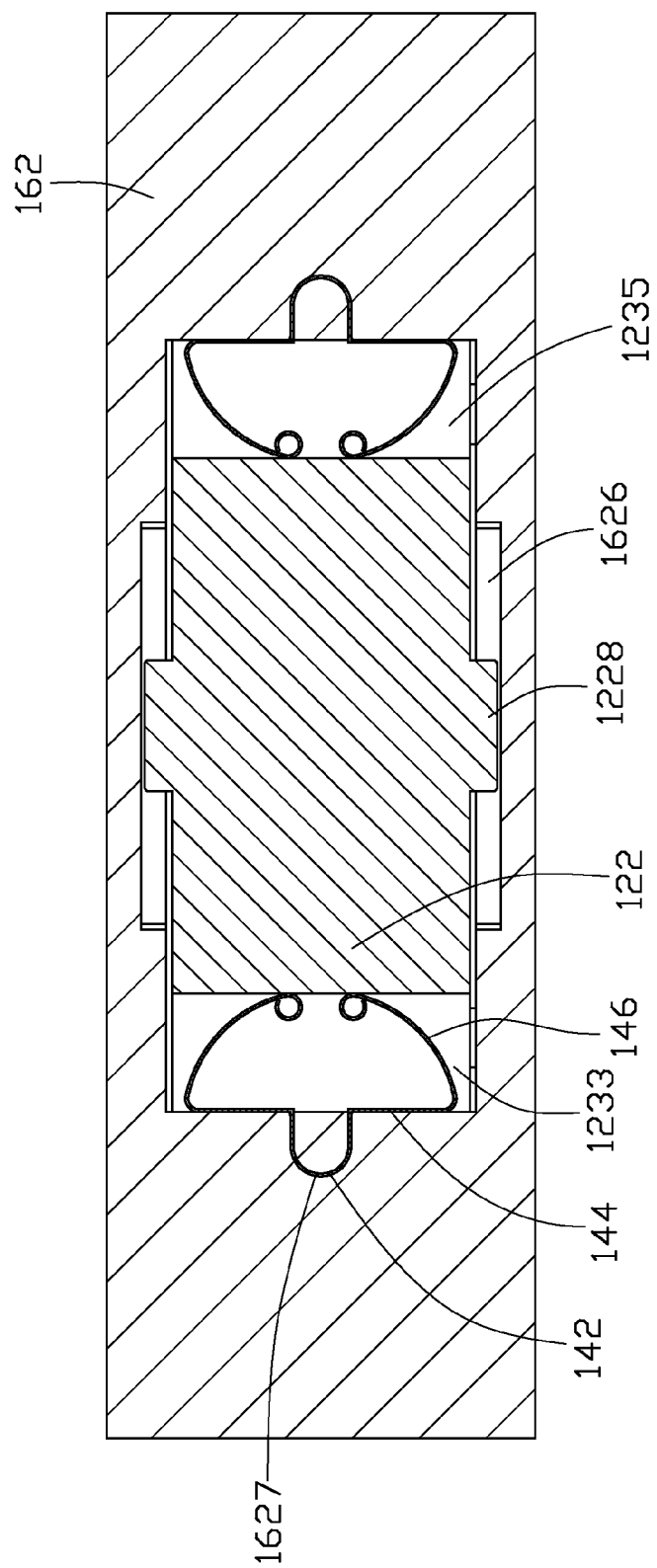
FIG. 5 is a cross-sectional view of the portable electronic device shown in FIG. 3.

Referring to FIGS. 3 and 5, to assemble the portable electronic device 100, firstly, the securing portions 142 of the elastic elements 14 are latched in the securing grooves 1627 of the peripheral wall 162, so the elastic elements 14 are latched to the base plate 16. Secondly, the first securing section 1230 and the third securing section 1233 are bent to pass through the hole 1621. Thirdly, the guiding blocks 1228 of the key body 12 are accommodated in the guiding grooves 1626 of the base plate 16. At this time, the first securing section 1230 and the third securing section 1233 entirely enter into the base plate 16 and restore to their original state, the first securing space 1232 and the second securing space 1235 respectively accommodate one elastic element 14 therein, the second securing section 1231 is accommodated in the second receiving space 1269, the fourth securing section 1234 is accommodated in the first receiving space 1268. Moreover, the compressing portions 146 of the elastic element are compressed to resist against first end 1225 and the second end 1226, respectively. Thus, the key body 12 are securely mounted to the base plate 16.

After that, the circuit board 20 is mounted to the bottom wall 164. At this stage, the first switch 22 is resisted against the area of the first contacting portion 1242 adjacent to the contacting surface 1222. In other words, the first switch 22 is resisted against the first contacting portion 1242 but not against the high-point of the first contacting portion 1242. The second switch 24 is resisted against the area of the second contacting portion 1262 adjacent to the contacting surface 1222. In other words, the second switch 24 is resisted against the second contacting portion 1262 but not against the high-point of the second contacting portion 1262.

Figure 4:
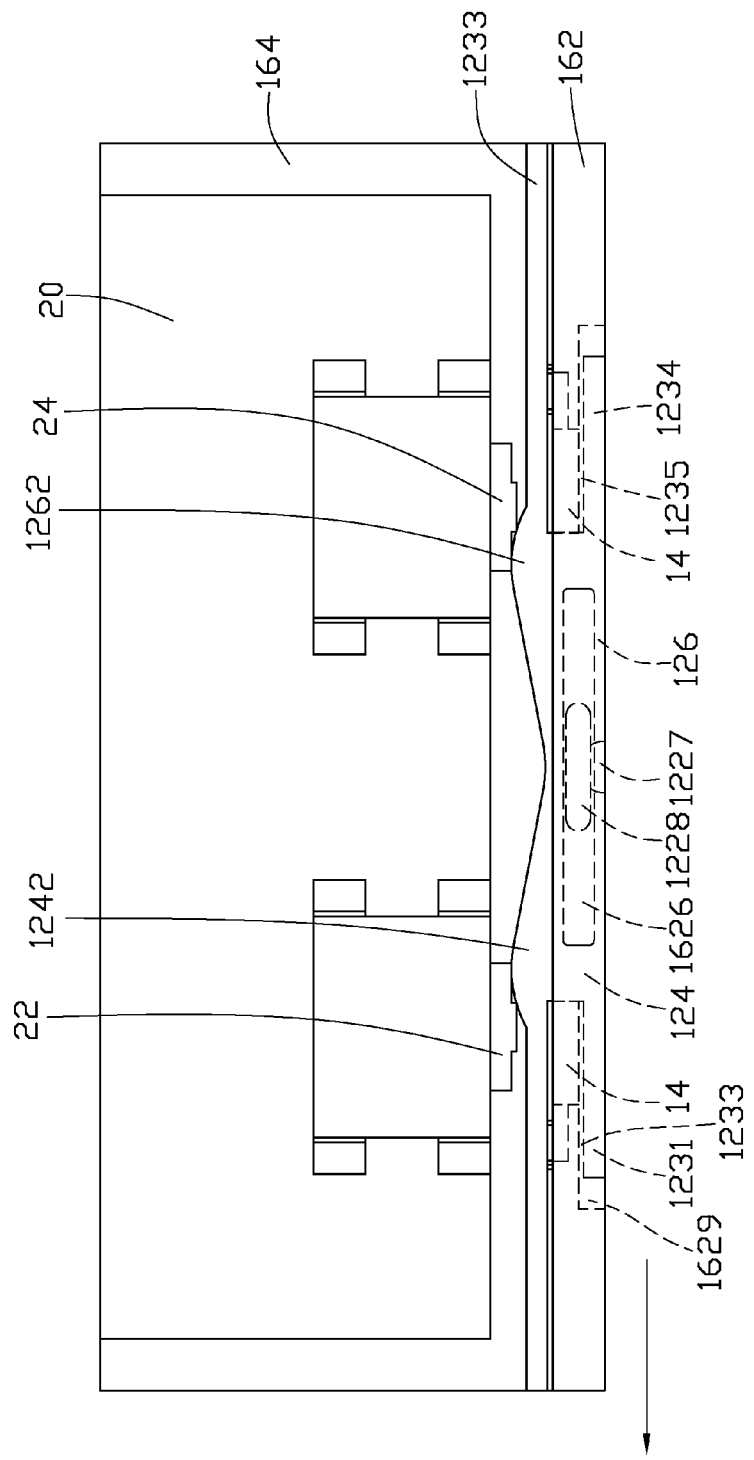
FIG. 4 is a perspective view of the portable electronic device shown in FIG. 3.
Figure 6:
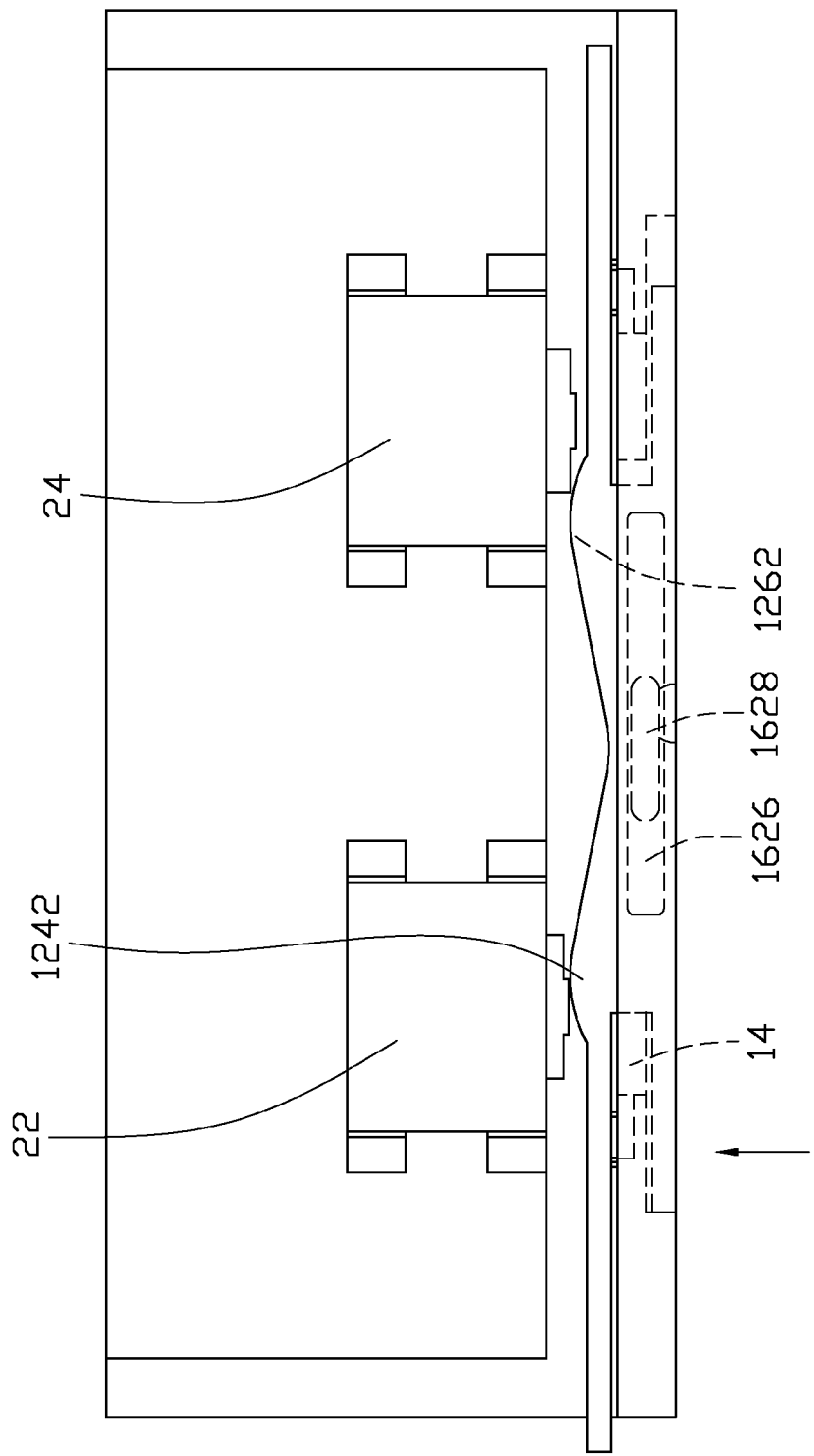
FIG. 6 is similar to FIG. 4, but one key being in pressed state.
Figure 7:
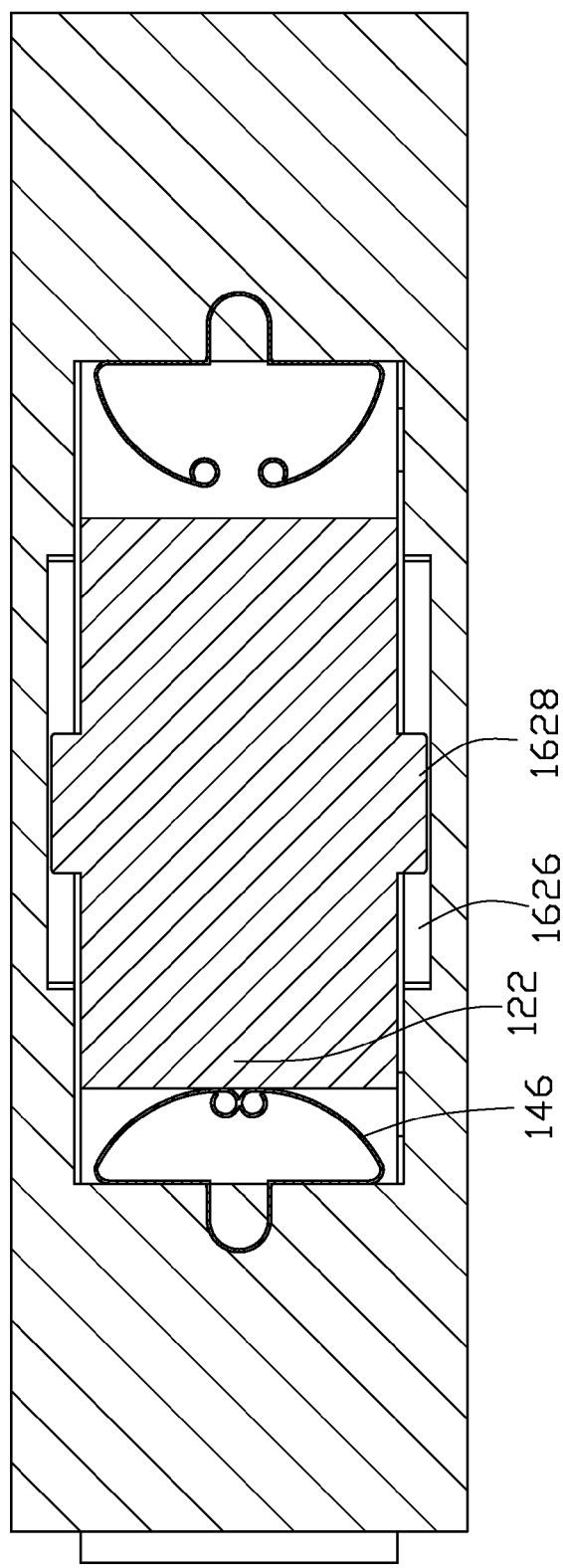
FIG. 7 is a cross-sectional view of the portable electronic device shown in FIG. 6.

Referring further to FIGS. 6 and 7, in the function of the first key section 124 is described herein, but can also apply to the second key section 126. Firstly, the first key section 124 is pushed in the direction of arrow shown in FIG. 4, to slide the key body 12 in the hole 1621 in the direction of arrow shown in FIG. 4. At this time, the guiding blocks 1228 slide in the guiding grooves 1626, the first end 1225 of key body 12 compress the compressing portion 146 in the first securing space 1232 to accumulate elastic force, thus the key body 12 can rebound when released. The first switch 22 move toward to the high-point of the first contacting portion 1242, i.e., the first contacting portion 1242 presses and triggers the first switch 22 in the direction of arrow shown in FIG. 6. Simultaneously, the second key section 126 moves in the direction of arrow shown in FIG. 4, i.e., the second switch 24 moves away from the high-point of the second contacting portion 1262, to prevent from triggering the second switch 24. Thus, a user's fingertip touches only one key section at a time, thus removing the possibility of hitting two keys simultaneously.

It is to be understood, however, that even though numerous characteristics and advantages of the exemplary disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device comprising:
    a circuit board, the circuit board has a first switch and a second switch mounted thereon; and a key assembly comprising:
    a base plate;
    two elastic elements, the elastic elements being both mounted to the base plate, and the elastic elements being spaced from and opposite to each other; and
    a key body, the key body slidably mounted to the base plate between the two elastic elements, the key body including a first key section and a second key section connected with the first key section, the first key section having an arcuate first contacting portion formed thereon, the second key section having an arcuate second contacting portion formed thereon, the first key section resisting one of the two elastic elements, the second key section resisting the other elastic element;
    wherein when the first key section slides toward and compresses the elastic element that resists the first key section, to trigger the first switch, the second key section slides away from the elastic element that resists the second key section, to prevent triggering the second switch.

2. The portable electronic of claim 1, wherein the key body has two guiding blocks respectively protruding from two opposite side surface thereof, the base plate has two guiding grooves defined therein corresponding to the guiding blocks, the guiding blocks are slidably accommodated in the guiding grooves.

3. The portable electronic of claim 2, wherein the base plate has a hole defined therein, the hole is configured for accommodated the key body therein, the guiding grooves are respectively defined in two opposite inner walls in the hole.

4. The portable electronic of claim 3, wherein each elastic element has a securing portion, the base plate defines two securing grooves defined in another two inner walls in the hole, the securing portions are latched in the securing grooves, correspondingly.

5. The portable electronic of claim 4, wherein the securing portion is U-shaped, each elastic element further includes two connecting portion oppositely protruding from two ends of the securing portion and two compressing portions respectively protruding from a distal end of each connecting portion, the compressing portions resist the key body.

6. The portable electronic of claim 1, wherein the first key section has a first securing section and a second securing section protruding outwardly from an end thereof, the first securing section are spaced from the second securing section to form a first securing space therebetween, the first securing space is configured to accommodate the elastic element resisting the first key section therein.

7. The portable electronic of claim 6, wherein the second key section has a third securing section and a fourth securing section protruding outwardly from an end thereof, the third securing section are spaced from the fourth securing section to form a second securing space therebetween, the second securing space is configured to accommodate the elastic element resisting the second key section therein.

* * * * *